ID=[19]

United States Patent
Barry

[11] 4,370,086
[45] Jan. 25, 1983

[54] ROTARY LOADER AND SIDE COUPLING SYSTEM

[76] Inventor: Leonard D. Barry, 19300 Pennington, Detroit, Mich. 48221

[21] Appl. No.: 66,688

[22] Filed: Aug. 15, 1979

[51] Int. Cl.³ .............................................. B65G 67/02
[52] U.S. Cl. ................................ 414/337; 414/744 R; 414/338; 104/21
[58] Field of Search ................... 414/334, 337, 338, 9, 414/383, 744 R, 607; 104/20, 21, 28–31; 198/480; 105/368

[56] References Cited

U.S. PATENT DOCUMENTS

| | | | |
|---|---|---|---|
| 1,094,060 | 4/1914 | Donovan | 414/337 |
| 1,495,339 | 5/1924 | Maher | 414/337 X |
| 2,957,594 | 10/1960 | Brenneman | 414/607 |
| 3,396,509 | 8/1968 | Hötger | 198/480 X |
| 3,484,002 | 12/1969 | Barry | 104/20 X |
| 3,865,041 | 2/1975 | Bacon | 104/20 |
| 3,896,738 | 7/1975 | Dubeta | 198/480 X |
| 3,956,994 | 5/1976 | Barry | 104/20 X |
| 3,991,889 | 11/1976 | Cox | 414/339 |
| 4,065,006 | 12/1977 | Barry | 414/337 X |
| 4,124,129 | 11/1978 | Barry | 104/28 X |
| 4,130,208 | 12/1978 | Barry | 414/334 |

*Primary Examiner*—John J. Love
*Assistant Examiner*—Terrance L. Siemens

[57] ABSTRACT

This rotary loader and side coupling system for transfer of semitrailers or containers has a vertical pivot post with one or more load handling lobes or turntables each mounted on a horizontal flat lobe on an end of a frame or arm which is hinged to a slip collar on the post and supported and propelled on wheels on a concentric cam track to revolve thereabout and lift and lower on slopes in the cam track to transfer a load on the lobe or turntable. The turntable is fronted with a bumper or face sloped or rounded or disc wheel to engage between pedestals or locators or into openings on a vehicle under the load. The turntable has two depending fingers spaced on opposite sides of the table's pivot for engaging the side of a vehicle or curb to turn the table to align with the vehicle or driveway for transfer. The turntable for trailers has pedestals spaced narrow at the front for reaching under the body rails between the wheels and landing gear and spaced wide along the inner side to support the side of the trailer facing the loader for stability for transferring a semi-trailer between a railway car and a station platform car, driveway or tractor. The lobe or turntable can serve as a coupler or preferably the loader has a coupling disc wheel supported under the lobe at constant coupling height while the turntable and/or lobe are lifted or lowered. Vehicles for coupling with the loader preferably have depressed center platforms or sills between pedestals or low sides and rollers for the coupling disc and/or lobe with or without turntable to enter between. A depressed-center semitrailer is provided to couple with this loader to handle containers. A two-lobed loader is designed especially to handle railway car body sized containers.

16 Claims, 52 Drawing Figures

ROTARY LOADER AND SIDE COUPLING SYSTEM

CROSS REFERENCE TO RELATED APPLICATIONS

This application is related to my pending application Ser. No. 957,710, filed Nov. 6, 1978, as an improvement thereof.

An object of this invention is to provide an improved load end for this rotary loader and improved side coupling to broaden the utility and improve the safety of the loading system. It is an object to extend and connect the curved fork ends to my prior loader so they become a bumper lobe or support a smooth faced turntable or disc wheel to prevent engagement in an opening between cars or load berths. The lobe is sloped (cam faced) on the end to guide it into engagement to increase coupling tolerance and to provide for disengagement if the loader starts to engage too late. It is therefore an object to eliminate the load and coupling forks and instead provide a smooth bumping face preferably with disc wheel, which can couple a car from a much less accurate start and engagement than my prior loader required and not foul with the car.

It is a further object to adapt my improved rotary arm loader to handle semitrailers directly without need for a pallet for the trailer, to simplify the system to cut costs and increase safety, to provide a semitrailer lift turntable for the loader's arm which is extended under the sill or body rails between the rear wheels and landing wheels and lifts to support the trailer.

To provide side coupling over a considerable range of height, side latches on the cars and coupling rods on the loader are provided, but a further object is to eliminate the latches and rods to reduce chance of entanglement and to provide curbs or low sides on the vehicle or load support to prevent the turntable from entering except where it will align for transfer. It is an object to provide a loader with increased lift ability especially needed to lift loads over low car sides and trailers over rub rails without requiring side coupling latches on the car. It is therefore an object to separate the lift from the coupling function and provide a coupling arm with lobe or disc which does not lift with the load arm. It is an object to provide a coupling arm which fits up under and into the load arm to reduce the thickness of the loader's lift end. It is an object to provide a fifth wheel unlocking mechanism on the trailer cars operated by the coupling arm.

It is an object to provide railway cars having a chassis and a detachable body and a loader therefore and further to provide a loader having a frame with two lobes for lifting long detachable railway car bodies from the chassis.

These, other, and further objects and features are attainable with this invention and should be obvious from study of this specification by those skilled in the related arts or will be pointed out herein with reference to the drawings wherein:

Referring to the drawings and in particular to FIGS. 1-4 wherein rotary loading station LS along railroad track T transfers semitrailers 20 from trailer cars 22 in train 24 passing from left to right and sets them in succession on station platform cars 26 on track ST.

Figures 1, 7:
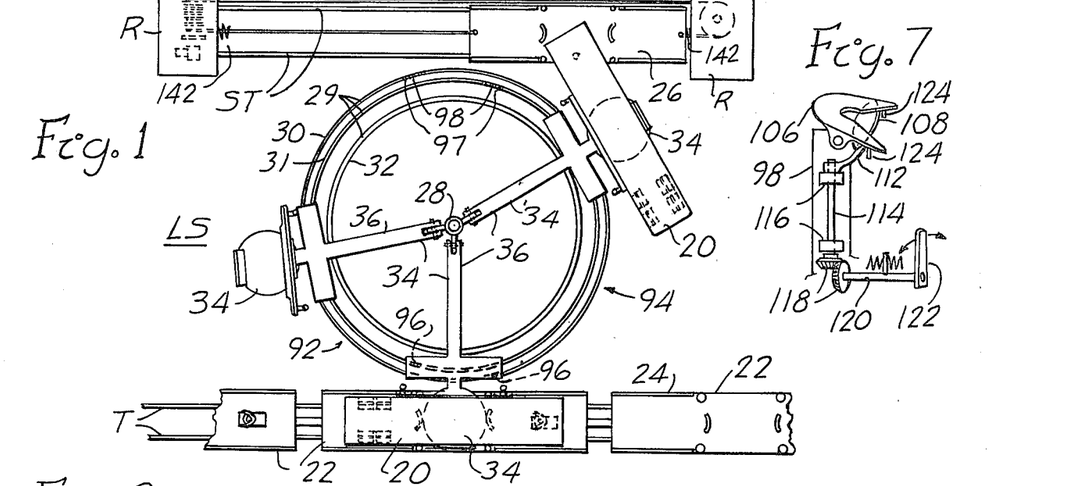
FIG. 1 is a plan view of a rotary loader station along a railroad transferring semitrailers between railway cars and station platform cars for truck tractor drive-away.
FIG. 7 is a schematic perspective of the fifthwheel lock and opening lever mechanism for the railway car.
Figure 2:
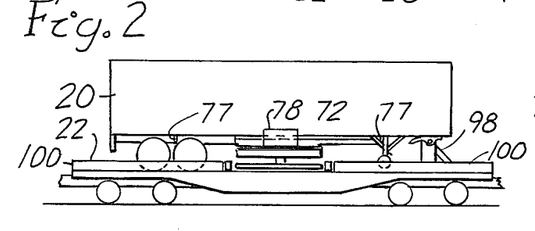
FIG. 2 is a side elevation of a railway car with trailer engaged by a loader on FIG. 1 as seen to a larger scale from the far side of the car from the loader.
Figure 3:
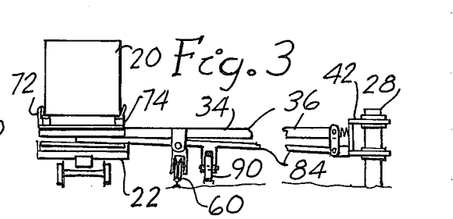
FIG. 3 is an end view of the trailer and car engaged by the loader of FIG. 2.

The station has a vertical pivot post 28 and concentric cam track 29, rails 30 and 31 and coupling support rail 32, around which one or more loaders 34 operate (three in FIG. 1). Each loader has a horizontal radial transfer arm 36 pivotally connected to revolve separately around post 28. Arm 36 is hinge mounted by pins 38 and 39, FIG. 4, and a link 40 on each side to a bracket 42 which has a top and bottom sleeve or ring over post 28 connected by a vertical plate 46. Arm 36 is held out from the post against a stop 48 by compression spring 50 pocketed between plate 46 and the end of the arm. The opposite end of the arm is widened to form a flat lobe 52 supporting a turntable 54 pivoted on pin 55. The arm has a cross member 56 between the turntable and pivot 28 with a leg 58 extending down from each end to a wheel 60 on cam rail 30 on the left side and 31 on the right side, FIG. 5. Preferably the legs are pivotally mounted to swing in a radial plane and wheels 60 grooved to follow irregularities on the track. Each wheel 60 is driven by a motor 64 and spur-gear reducer 66 on opposite sides of wheel 60 with motor shaft 68 connected through a hollow wheel shaft 69, or the loader can be driven as those in my patent application Ser. No. 957,710.

Figures 4, 5, 6, 8, 9:
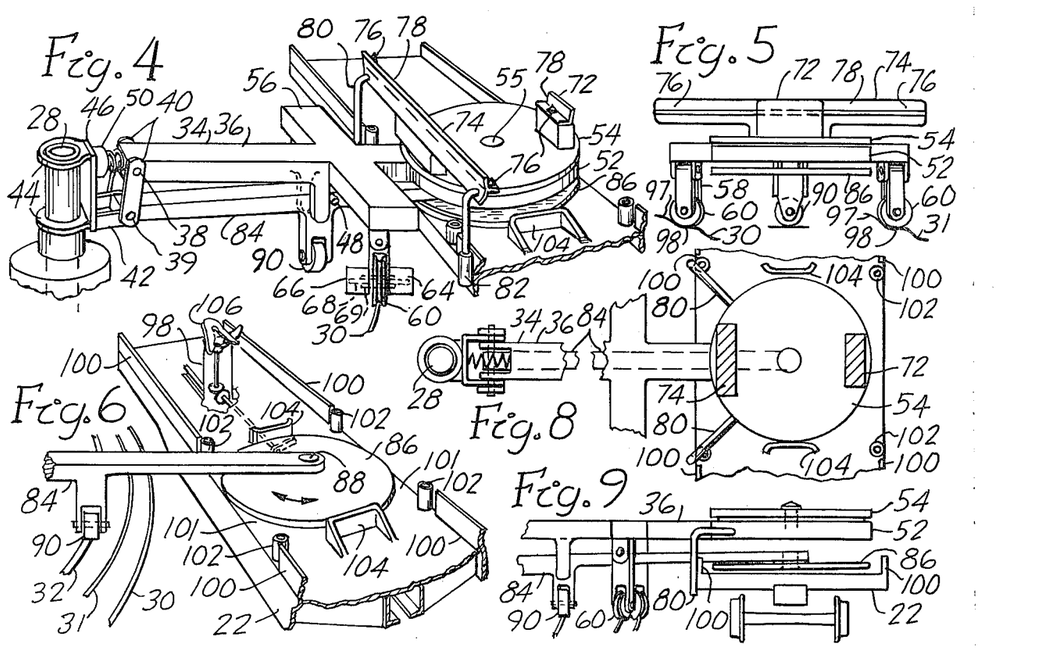
FIG. 4 is a perspective view of a loader engaging a station car.
FIG. 5 is a front view of a loader at the station track.
FIG. 6 is a perspective of a portion of the coupling arm of a loader engaging a railway car passing the station.
FIGS. 8 and 9 are partial plan and side views of a loader extended over a railway car.

Referring to FIGS. 4 and 5, turntable 54 has two pedestals 72 and 74 for supporting opposite sides of a semitrailer 20, a short outer one 72 for supporting under a relatively short length of the trailer along the far side edge from pivot 28 and a long inner (near side) one 74 of the same height as the outer one for supporting along about half the length of the near side of the trailer or at points spaced apart to provide a stable support. This table with its pedestals can reach under the trailer and under its body rails with clearance to position for lifting the trailer. The pedestals can have conical locators 76 or pins that engage in holes in the bottom of the trailer or tabs 77 on the trailers that align the long ends of pedestals 74 to keep the trailer in place lengthwise. The tops of the pedestals each have an upstanding flat 78 sloped out along their outer edge to accurately engage and limit sidewise movement on the pedestals. The table has two alignment or locating rods 80 one on each end of the long pedestal to engage the side of a car to align the table parallel for transfer. Rollers 82 are preferably added over the ends of rods 80 to reduce coupling friction. Optionally the rods can extend horizontally from the table and then straight down as in FIGS. 7 and 8. A coupling arm 84 is pivoted at one end between the lower ends of links 40 and pin 39 and extends parallel under arm 36 to support a coupling disc 86, FIG. 6, aligned under the turntable on pivot 88. Arm 36 is in section a channel so arm 84 can recess therein to keep down the total thickness of the table and disc. Arm 84 is supported on a roller 90 on concentric track 32 to hold the coupling disc wheel 86 at coupling height through each transfer run.

Cam track rails 30 and 31 each have a low portion 92 and a high portion 94 connected by slopes 96 down and 97 up traveling clockwise. The right half of cam track 29, FIG. 1, is about a foot higher if full size than the left half 92. Slopes 96 and 97 in rail 30 are displaced the distance between legs 58 clockwise from these slopes in rail 31 so the loader lifts both ends of the load level. Slopes 97 have a level or slight depression or step 98 a little over halfway up where the trailer is set down so the loader can be stopped there to check that the trailer is in position for the loader to be withdrawn or lifted. This dwell enables a tractor to hitch or unhitch the trailer before the loader is withdrawn or lifted so the landing wheels need not be lowered and is provided especially where the loader sets the trailer on a driveway to wait for the tractor to hitch up.

Each trailer car 22 is a flat car with hitch 98 for each trailer, ie. a piggyback car, and has a low side 100, FIG. 6, along each side except at 101 where the coupling disc enters over the car between rollers 102. Transverse central curb plates 104 secured to the bed of car 22 guide the coupling disc to align for transfer.

The trailer hitch 98 has a fifth wheel 106 with rotary lock 108 opened by the loader to receive or free the kingpin of the trailer. Lock 108, FIG. 7, is a segment of a circle in plan and is secured by arm 112 down and in to vertical shaft 114 on the pivot center of the segment. Shaft 114 is supported in bearings 116 on hitch stand 98. Beveled gears 118 at the bottom of shaft 114 connect it to shaft 120 along the center line of car 22 to lever 122 standing under where disc 86 moves over the car to turn lever 122 into a recess to rotate the lock segment out either side of the fifth wheel to open it for transfer. Depending fingers 124 on the fifth wheel hold the segment lock firmly on its axis against the force of the trailer.

Each trailer 20 is lifted off a car 22 by a loader 34 turning counterclockwise in FIG. 1, engaging the forward locator 80 against the side of the car. This turns table 54 to align parallel the car as disc 86 engages the forward edge of the opening 101 in side 100 of the car, pushing the car forward and entering between rollers 102 over the car to position under the trailer 20. Next arm 36 is pushed back against spring 50 toward pivot 28 as the loader runs up slopes 96 lifting the trailer from the car. When the loader swings in the transfer arc far enough to leave the front edge of the side opening 101 it accelerates out from the car with the trailer lifted to clear sides 100 and rub rails. The trailer unloaded from the train is set down on a platform car 26 with its landing wheels down, or its kingpin is engaged with the fifth wheel on truck tractor 126 in position of car 26. The loader continues to rotate and moves car 26 to the left as it swings its coupling disc and turntable from under the trailer so the tractor can drive the trailer off when the car or cars 26 reach an end ramp. When cars 26 are unloaded a car puller CP is used to return the cars to the right end of track ST to position for receiving more trailers.

To load a trailer on a train it is driven on cars 26 by tractor and uncoupled in transfer position on a car 26. A loader 34 rotating clockwise engages its disc in opening 101 as the forward roller 82 rolls forward on the side of car 26 to align table 54 under the trailer before slope 69 lifts it off car 26 and the loader continues to turn to position to wait for train. The loader is started to rotate clockwise by controls as in FIGS. 13-16 of my U.S. patent application Ser. No. 957,710, to engage an empty berth in a car 22 in the train to load the trailer thereon and continues rotating away to the left.

Station car 26 can be the same as car 22 except the trailer hitch is preferably omitted, or the station car can be simply a moveable platform. A chain of several station cars can be provided for rapidly receiving or loading several trailers for the loaders to rapidly unload or load a train. Cars 26 abut a ramp R at each end of their track for circus type loading and unloading.

VARIATIONS

Corresponding parts of variations are given the same number if the same, or a suffix is added if the part is modified enough to mention.

Referring to FIGS. 10-13 where station LS1 is shown with 30 and 31 rotated 180° and one loader 34A thereon the same as loader 34 except coupling arm 84 is omitted and alignment rods 80 are used for coupling. Accordingly each railway car 22A and each platform car 26A has two facing latches 128 in a resiliently mounted frame, as in FIGS. 15-16 of my U.S. Pat. No. 4,065,006, added on each side for each berth to be coupled by alignment rods 80 latching between oppositely turned latches 128 to couple in alignment with a berth for transfer. Sides 100, rollers 102, and curbs 104 can be omitted from car 22A or can remain to serve station LS also.

Platform car 26A, shown in FIGS. 10 and 12-13 and 15 has a channel 130 turned legs down along each side, cross members 132 and covering floor 134 between the channels, and flanged rollers 136 on pins 138 between the legs of each channel 130 to support the platform to roll on rails 140 along in driveway SD. Ends of the platform are sloped so truck tractors and trailers can be driven on or off either end anywhere along track ST'. Platform 26A has two double latches 128 on the side facing loader 34A to catch the alignment bars of the loader to move car 26A about 40 feet to transfer a 40 foot trailer 20. A cable drive or car puller CP can return the car for the next transfer in the same direction of rotation, or car 264 can be moved back by the loader when loading to make a transfer to a train in the opposite direction.

Figures 10, 11, 12, 14, 15, 16, 17:
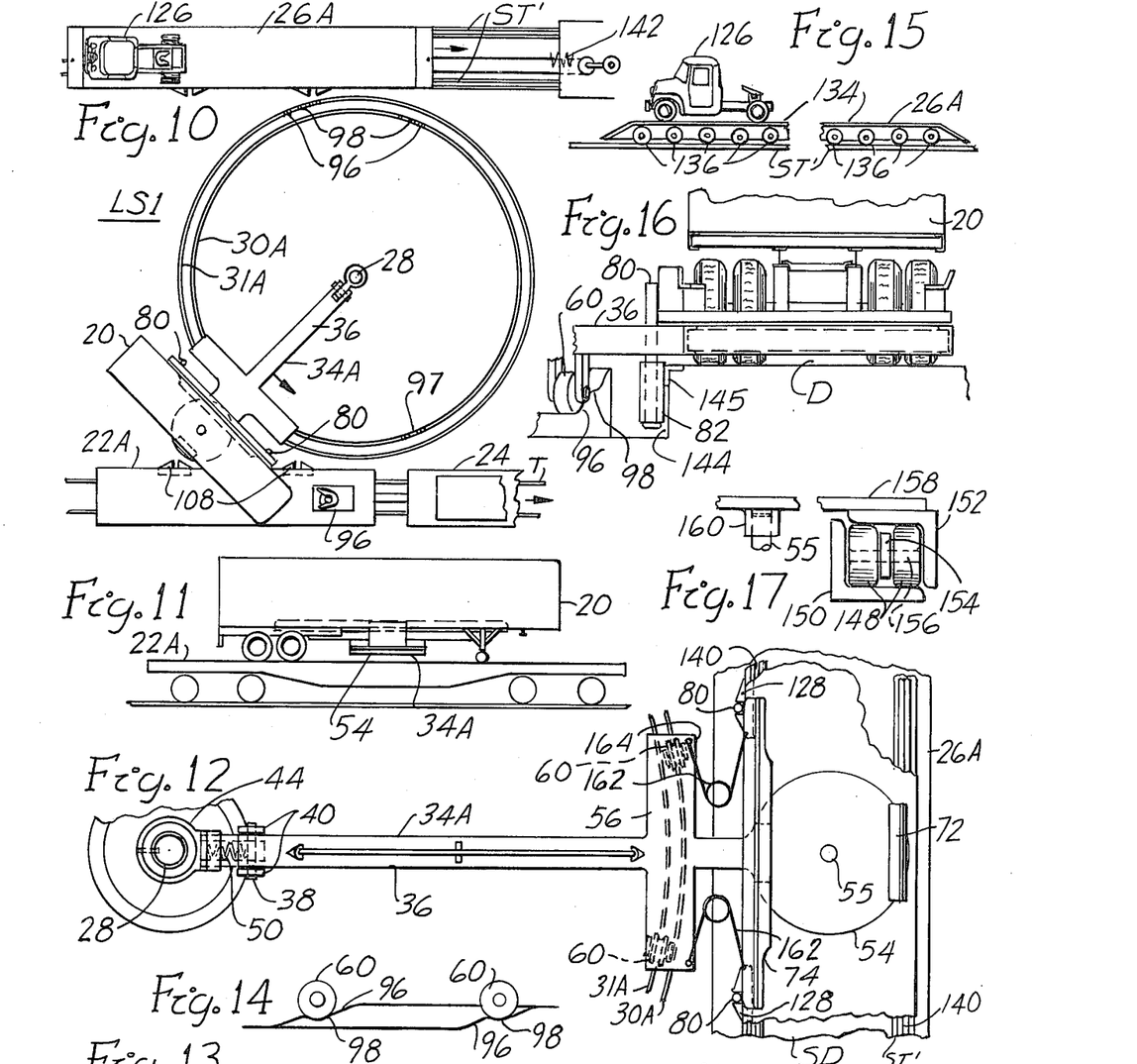
FIG. 10 is a plan view of a station with a variation of the loader and cars that couple with alignment rods and latches.
FIG. 11 is a front view of the loader in FIG. 10 when fully coupled with a railway car and trailer to larger scale.
FIGS. 12 and 13 are respectively plan and side views of the loader of FIG. 10 to a larger scale and coupled to a platform vehicle at the station FIG. 10.
FIG. 14 is a schematic elevation of the cam track slopes along the station track.
FIG. 15 is a side view of the platform car of FIG. 10 with truck tractor thereon waiting for the loader to set a trailer on the platform car for the tractor to engage.
FIG. 16 is a side view of the end of a load arm under a trailer on a driveway after lowering or before lifting to larger scale.
FIG. 17 is a sectional view of the loader's turntable at the rim to larger scale.
Figure 13:
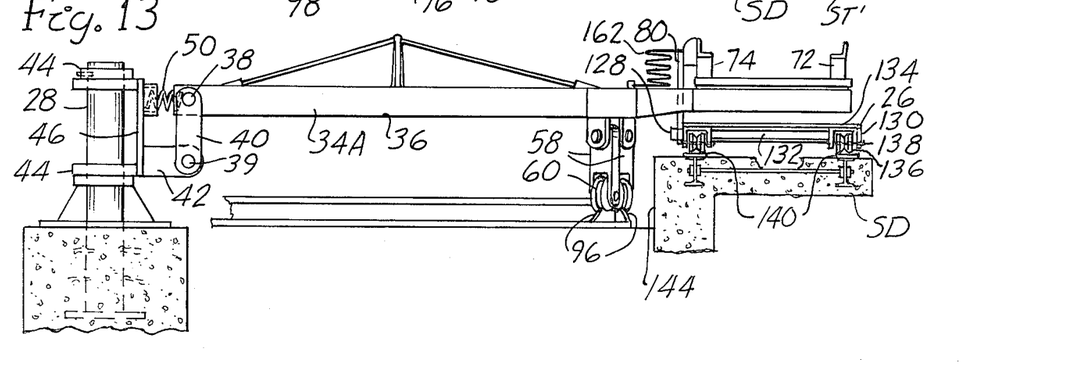

Trailer 20 lifted off platform 26A by loader 34A turning counterclockwise is started and shown in FIG. 10 about to engage its forward alignment rod 80 between latches 128 of the forward latch block, which turns table 54 to align parallel car 22A and engages the rear latch block as it moves with car 22A through tangency therewith where slopes 97 in cam rails 30 and 31 lower the trailer to the bed of car 22A.

The arm 36 of loader 26 or 26A retracts in toward pivot post 28 against spring 50 when both locators 80 engage the side of a car and follows a chord parallel track T or ST across a portion of the transfer arc to keep the loader aligned exactly when the trailer or other load is lifted or lowered. This also dampens out rocking of the car and compensates for variations in the transverse positions of the cars and shift of tracks T and ST.

Trailer 20 is unloaded from a train moving right to left in FIG. 10 and is set down on platform 26A with either its landing wheels down or a truck tractor 126 in position on car 26A to receive the kingpin of the trailer. The loader continues to rotate and moves out from over car 26A, pushing it to the right as it disengages first the forward and after the rear latch block as car 26A reaches the right end of its track. Long compression springs 142 are end stops for car 26A to let it push the stop spring in when releasing the rear coupling pin 80 to return the car to coupling position for that end.

Referring to FIG. 16, either loader can set the trailer directly on a driveway D in place of the platform car 26 or 26A. The driveway is along a ledge 144 having a steel angle edge 145 along the top facing the loader for rollers 82 to roll along to align the turntable parallel to the driveway, which is at a height to receive the trailer when lowered by slow turning of the loader which would be stopped on steps 98 until the trailer is coupled to tractor 126 and driven slowly as the loader is pushed along with the trailer until out from under it in about 30 feet for a 40 foot trailer.

To load the trailer from driveway D, the trailer is driven along it with tractor 126 as the loader is carefully moved or jogged under it until the loader is lifted to steps 98 to engage the bottom side edges of the trailer on pedestals 72 and 74. Tractor 126 is then uncoupled and driven away and the loader lifted the remainder of slopes 96 and moved to starting position for loading the trailer on a railway car. The trailer can have transverse guide bars or tabs 77 which move the turntable along with the trailer until it can be swung out from under.

Referring to FIGS. 16 and 17 for further details of the turntable, turntable 54 has rollers 148 in a raceway formed of rolled angle rings; a bottom inner one 150 rolled legs out and up and a top outer one 152 rolled legs in and down. Rollers 148 are secured to a strap ring 154 by pins or bolts 156 to roll between angles 150 and 152. The table has a circular top plate 158 with central depending pipe 160 which fits over pivot pin 55 extending up from arm 36. The table can be turned by springs 162, FIGS. 12 and 13 to turn the table at right angles to arm 36 when not engaged with a car 22 or 26. It also has its turning movement limited to that needed for alignment for transfer by the springs or by stops 164.

LOADERS FOR CARGO CONTAINERS

The loaders for cargo containers are improved by features of the loaders for trailers. The loaders are designed to present a smooth front (instead of forks) and the side hooks on the cars are omitted so as not to catch incorrectly.

Figure 18:
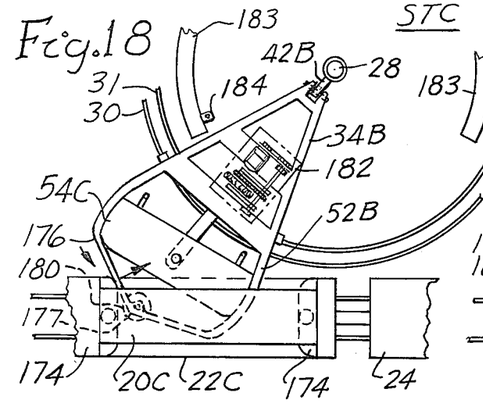
FIGS. 18 and 19 are plan views of a loader with safety cam bumper lobe showing two faulty engagements of the loader with a vehicle and how they are corrected, FIG. 18 to complete coupling, and FIG. 19 to expel the loader from over the car.
Figure 19:
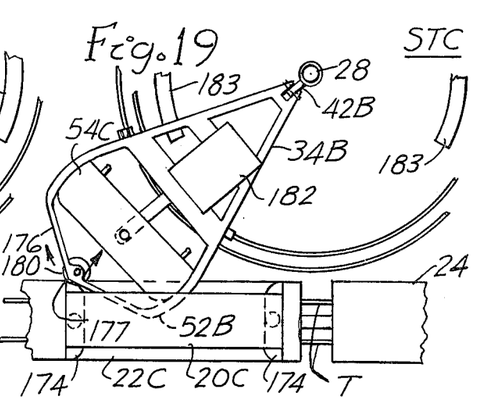

Loader 34B, shown in FIGS. 18 and 19 engaging between pedestals 174 under container 20C on car 22C in train 24 on track T passing station STC, improves on my prior pending loader Ser. No. 957,710 by connecting the fork ends with a bumper 176 preferably peaked out at the middle 177 and sloped toward where the curved forks ended to join and so replace the forks by the resulting lobe 52B, which on loader 34B extends from bracket 42B on pivot 28 out and across the front and back to the bracket. A horizontal disc wheel 180 at the peak 177 helps prevent a dead center jam. Optionally the inner ends of the lobe can be terminated on the arms 56A over wheels 60, loader 34B', FIG. 20. These loaders have a load turntable 54C and a drive 182 as in my pending application Ser. No. 957,710, FIGS. 70 and 3–5 respectively. Drive 182 engages a concentric driveway 183 except along where coupled to a propelling vehicle such as train 24 to take advantage of the bumper to direct movement of the loader. If the loader, disconnected of drive, were engaged late with the train as in FIG. 18 it will be moved with the train to the right to engage correctly as the arrows show. If the loader is early or too late it is shoved back away from car 22C as the arrows show in FIG. 19 and preferably is shut off or reversed by a directional limit switch 184.

Figures 20, 21, 22:
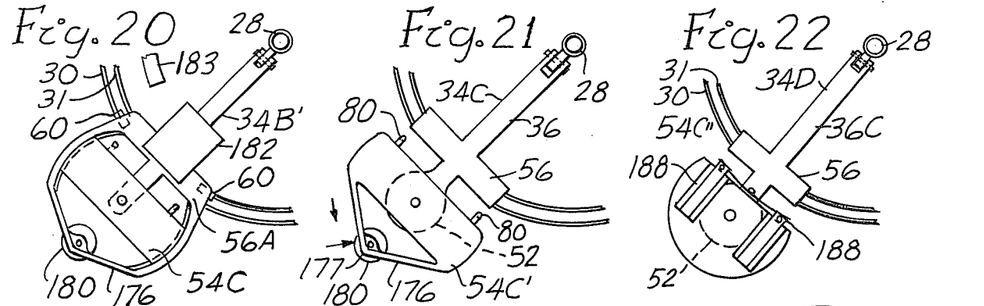
FIG. 20 is a plan view of a variation of the loader of FIGS. 18 and 19.
FIG. 21 is a plan view of a loader having a load alignment table having a safety cam bumper.
FIG. 22 is a plan view of a rotary loader having a circular alignment and coupling table.

Loader 34C, FIG. 21, has turntable 54C' extended beyond lobes 52 on arm 36, and table 54C' has a bumper 176 giving it the configuration of a lobe. The turning of this table is more limited by rods 80 engaging arms 56 to keep the slopes of bumper 176 abuting the pedestals directing force (arrow) to one or the other side of pivot 28. Turntable 54C" is circular on loader 34D, FIG. 22, so revolving the table on its axis has no effect on the angle of bumping, therefore the turning of this table need not be as limited as the peaked front table of FIG. 21.

The loaders of FIGS. 18–22 can have alignment carriage 188, FIG. 22, on their tables to better align the load as will be described with FIGS. 34–35.

The coupling disc feature of loader 34, FIGS. 1–9, can be applied to container loaders. Referring to FIGS. 23–26, loader 34' has a coupling disc 86 on arm 84, under a load support turntable 54' on arm 36, hinge mounted on pin 39 and supported by wheel 90 on track 32 so only the load table need lift for transfer so the coupling height can be constant during transfer to reduce the height of the coupling pedestals or ledges 190 between which is opening 101C for the load table and coupling disc to enter with nested arms plus clearance. The coupling arm 84 fits into the load arm 36, as in FIG. 23, when the load arm is lowered to fit in the shallow opening 101C between the container and car. The loader arm 36 is strengthened by using a hat section in place of a channel. Lobe 52 is a channel rolled legs in nearly to a circle and secured on the end of the hat section and braced thereto central with channels 192. Pivot pin 55 on top of the hat section is engaged by cup 160 on the turntable. Coupling arm 84 fits into the hat and suspends disc 86 on pin 88 aligning pin 55.

Figures 23, 24, 25, 26, 27, 28, 29:
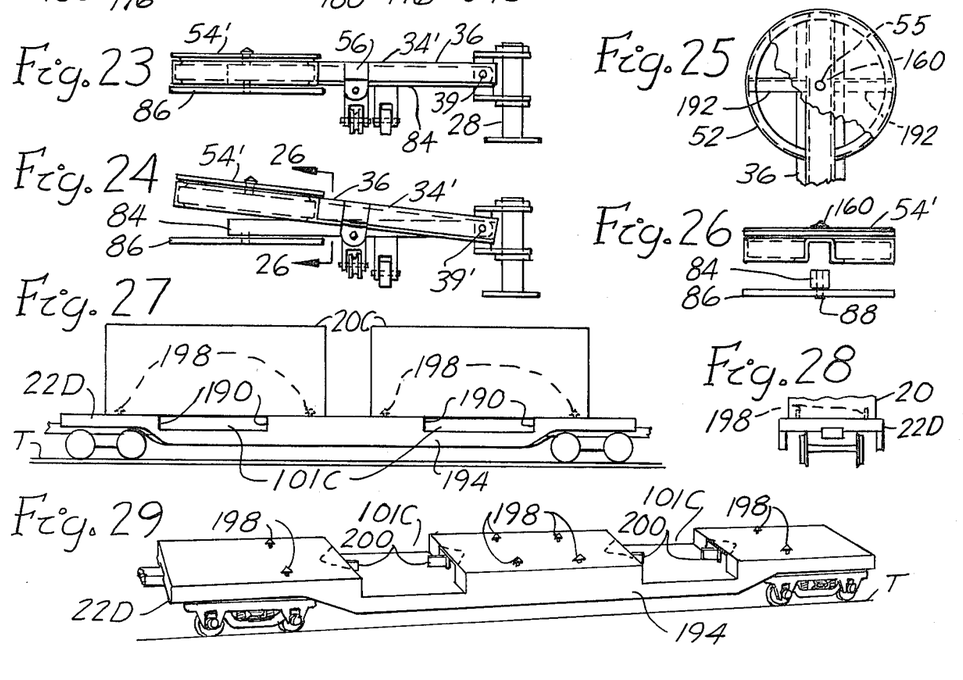
FIGS. 23 and 24 are side views of a loader with load table and coupling disc on separate arms respectively lowered and lifted.
FIG. 25 is a plan view of the load table of FIGS. 23–24.
FIG. 26 is a section on line 26—26 of FIG. 24.
FIGS. 27 and 28 are respectively side and end elevations of a railway car with containers, one being engaged by a loader.
FIG. 29 is a perspective of this railway car for coupling with a loader of FIGS. 18–26.

The preferred railway car 22D for containers 20C, FIGS. 27–29, has a flat bed or frame 194 with a depression 101C for each container berth for a loader of type FIGS. 18–26 to fit in under a container. The car has locators 198 for holding the container in place which are preferably turn locks for corner castings opened by the loader turning levers 200 as in FIGS. 19–21 and 23–24 of my pending application Ser. No. 957,710.

Referring to FIGS. 30–35 for further details, loader 34C has a cross-shaped frame 36C having a lobe head 52 supporting a load turntable 54C at one end and pivoted and hinged to post 28 at the base end. The cross runs around pivot 28 on wheels 60 below the arms of the cross each on one of two rails 30 and 31 concentric about pivot 28. Wheels 60 are driven by gearmotor 64 through magnetic clutch 202 which can slip if desired to relieve excessive force wherealong the loader is coupled to car 22C or 22D. Depending fingers 80 on alignment slides 188 engage the side of car 22C or 22D to turn the table parallel over the car between pedestals 190 and is lifted by track slopes 96 when in position in FIG. 31 to lift off the container to clear locators 198. The load support slides 188 on table 54C each have a section as in FIG. 35 comprising a bar with a groove along each side to slide between two Z-bars 208, an alignment pin 80 at the in facing end, and a spring 210 engaging a pin 212 at the outfacing end to extend the slide out until engaged with a car to transversely align thereon for transfer. Locating cones or pins 214 hold the container on the loader.

Figures 30, 31, 32, 33, 34, 35, 36, 37, 38, 39, 40, 41, 42:
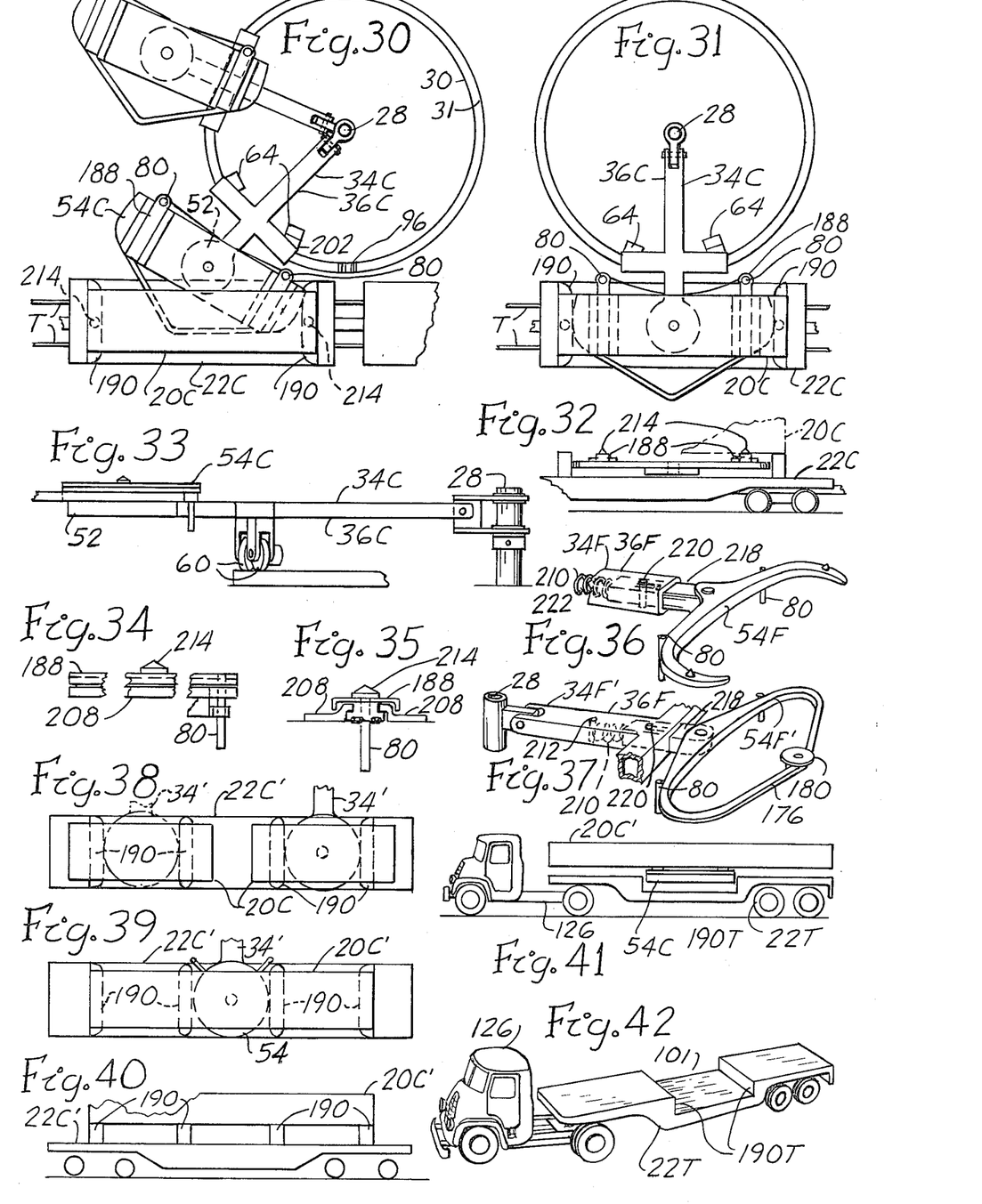
FIGS. 30 and 31 are successive plan views of a loader for handling containers, engaging under a container on a railway car.
FIG. 32 is a partial front elevation of FIG. 29.
FIG. 33 is a side elevation of the loader of FIGS. 31–32 to larger scale.
FIG. 34 is a side view of a load alignment support slide on the alignment table of the loader of FIGS. 30–33 to larger scale.
FIG. 35 is a near end view of a load support slide to larger scale.
FIGS. 36 and 37 are partial perspective views of variations of the loader arm and load support and coupling table.
FIGS. 38 and 39 are plan views of a loader of FIGS. 23-26 engaging respectively a 20' and 40' container on a railway car with pedestals for two 20' containers or one 40' container.
FIG. 40 is a side elevation of FIG. 39.
FIG. 41 is a side elevation of the alignment table of a loader extended over a depressed center semitrailer transferring a container.
FIG. 42 is a perspective of the tractor-trailer of FIG. 41.
Figures 43, 44, 45, 48, 49:
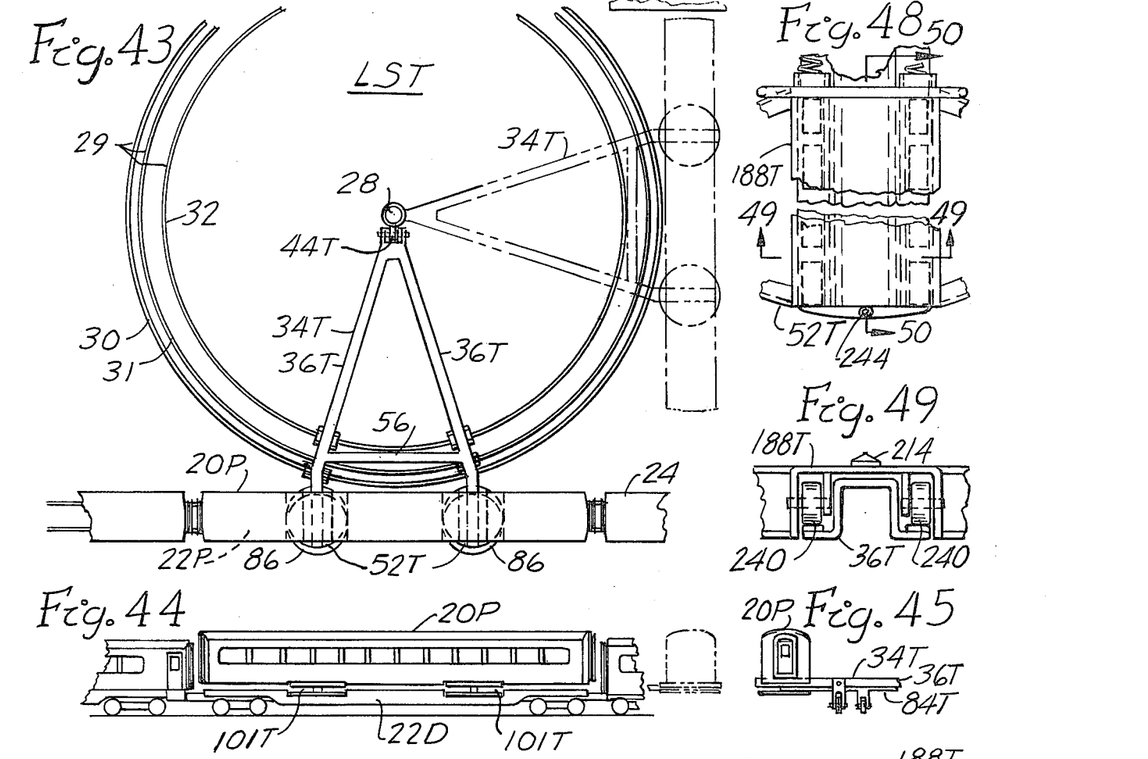
FIG. 43 is a plan view of a two-lobe single frame loader engaged over a railway passenger car in a train.
FIG. 44 is a side elevation of the loader of FIG. 43 lifting a passenger car body from its chassis in the train.
FIG. 45 is an end view of the car body of FIG. 44 on end of the loader.
FIG. 48 is a plan view of an alignment table on a lobe of this loader to larger scale.
FIGS. 49 and 50 are sections on respectively lines 49—49 and 50—50 of FIG. 48.

A pin 80 can be lifted out so the turntable 54C can be rotated as shown in FIG. 30 parallel to arm 36C with or without a load to reduce storage space if several loaders are mounted on a pivot and/or to bring end doors of a container to a dock.

Referring to FIGS. 36 and 37 for loaders 34F and 34F' with respectively alignment fork and bumper faced turntables 54F and 54F' both pivoted off center of the load on the end of a telescoping member 218 which slides in a hollow load arm 36F between limits set by pin 220 through a slot in member 218 and holes in arm 36F and extended by compression spring 222 as another way to cushion the arm engaging a car or curb. Turntable 54F' with peaked bumper 176 is preferred to table 54F.

Pedestals 190 on the cars can be spaced as in FIGS. 38–40 to enable two 20-foot containers 20C as in FIG. 38 or one 40-foot container 20C', FIGS. 39–40, to be set on car 22C' with the same loader 34', which has a turntable 54' that fits between pedestals 190 in any of three positions shown.

Referring to FIGS. 41–42, highway tractor 126 is coupled to a depressed center semitrailer 22T whose end ledges or platforms 190T support a container 20C or 20C' so the loader can couple and reach between the ledges 190T for transfer. Tractor 126 would move the semitrailer along a driveway tangent to the loader track at lift slopes 97 while the loader would be driven or pushed to engage the load table between ledges 190T.

Referring to FIGS. 43–47, station LST along track T has a pivot post 28 about which a two lobe rotary loader 34T turns on concentric rails 30 and 31. Loader 34T has a frame supporting two lobes 52T each on the outer end of a radial arm 36T connected by cross member 56 into a triangular frame with the arms 36T extending farther out and bent parallel a line bisecting the angle between the arms. Each arm 36T supports a lobe 52T to roll on wheels 240 to telescope in on the outer end each to support an end of a load such as the car body 20P of railway passenger car 22P in train 24 tangentially passing the loader station.

Each arm 36T of the loader is in section a channel turned legs down from pivot 28 end out to the cross member 56 and from there out to the end has out-turned lower flanges forming a hat section. Each lobe 52T is on a carriage 188T which is a channel, FIGS. 48–50, with rollers 240 mounted along inner faces of the les to roll on the bottom flanges of the hat section of arm 36T between stop 244 and spring 210T which extends the carriage out to the stop. The carriage has a channel, bent legs-in around nearly half a circle, extending out from the outer side of each leg of the channel to form a circular lobe 52T to locate the loader on the car body which has openings 101T' which align openings 101T on its chassis 22D. Each carriage 188T has a central cone 214 to locate in a hole on the container or car body.

Two tubular coupling arms 84T are pivotally mounted on pin 39 with arms 36T to bracket 44T mounted to turn about pivot post 28. Each arm 84T is housed in the channel section of an arm 36T. Arms 36T are supported on grooved wheels 60 on cam track rails 30 and 31 to lift and lower relative to arms 84T supported on wheels 90 on concentric track 32. Each coupling arm 84T has a horizontal coupling disc wheel 86 mounted under on pin 88 at the outer end to engage into opening 101T on the chassis of car 22P, FIG. 29. Arms 84T are the same as arms 84 except they are bent to follow inside arms 36T.

This loader is powered through wheels 60 as is loader 34 to transfer similarly except it has no turntable and slightly inaccurate alignment because of slight variation of the distance between cones 214 when carriages 188T are unequally extended because of the curvature of the transfer arc. Therefore the holes in the containers or car bodies in which cones 214 engage are large, resiliently mounted, or the carriages 188T have sufficient side travel to accomodate this movement.

Figures 46, 47, 50, 51, 52:
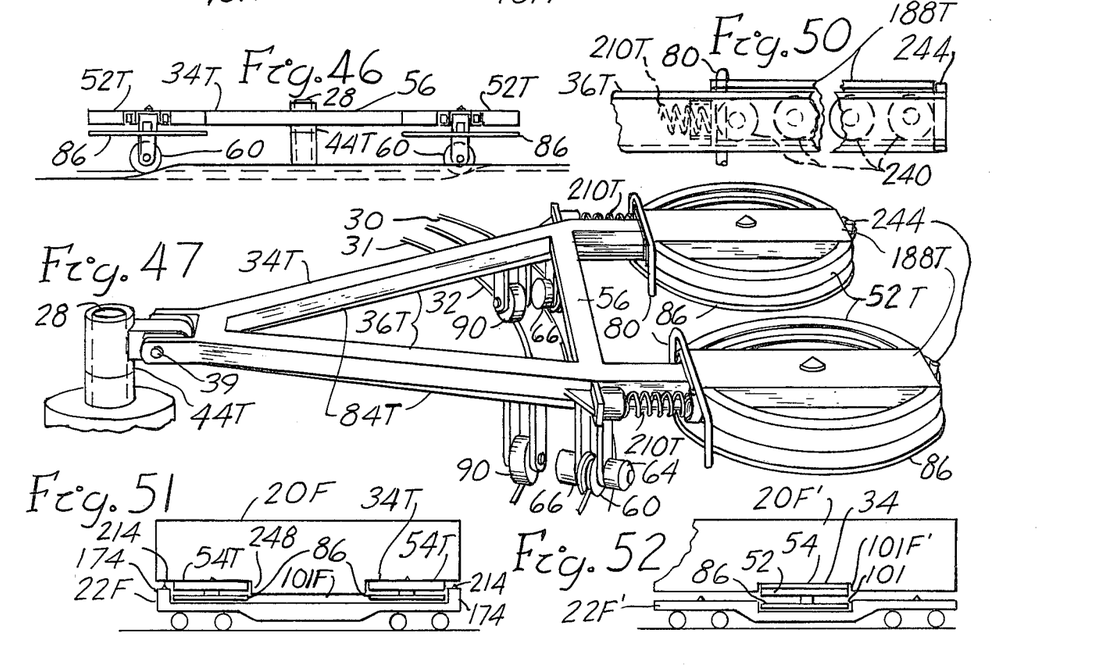
FIG. 46 is a front view of the loader of FIG. 43 to larger scale.
FIG. 47 is a perspective view of the loader of FIG. 43.
FIGS. 51 and 52 are side elevations of different freight cars each with a detachable body lifted on respectively a two-lobe and a one-lobe loader over their chassis.

The loader is especially suited for handling long loads such as a railway passenger car body 20P and is of sufficiently sturdy design to handle loaded or empty freight car bodies, which are extra large containers. Freight car body 20F, FIG. 51 is lifted by loader 34T from a railway pedestal car, chassis 22F, which has a flat bed or frame with end pedestals 174 with locators 214. The car body rests on pedestals 174 when set down and has a drop center 248 to increase load capacity and rest on the bed of the car between end openings 101F between the end pedestals and the drop center which also serves to locate the lobes 52T of the loader 34T with reference to the car body.

Loader 34 also can be built to handle freight car sized containers as seen in FIG. 52 where freight car body 20F' has a central rabbet opening 101F' through for the turntable 54 to align and support the load for transfer to a depressed center car 22F' having a shallow rabbet depression 101 for the coupling disc 86 to align in. Cars 22C and 22D can also handle the full width-of-car containers.

Each car 22F or 22F' carries one container at a time so it can be operated as an ordinary freight car and left in sidings where there is no loader.

Having thus described some embodiments and applications of my invention these are not intended as a limitation on the scope of my invention which is intended to be covered in all variations and applications thereof which would be apparent to those skilled in the arts and which come within the true spirit and scope of my invention.

I claim as my invention:

1. A rotary loader having a single vertical pivot about which the loader revolves and at least one load arm which rotates about said pivot, means for engaging said arm with a relatively moving vehicle, a turntable mounted opposite said pivot for engaging and supporting a load, and means for aligning said turntable parallel to said vehicle in register for transfer of said load to or from said vehicle when moving past said loader engaged therewith.

2. A loader as in claim 1, said means for aligning including two depending members secured to said turntable and spaced apart to engage at points along the vehicle fore and aft of the pivot axis of the turntable to align the turntable parallel over the vehicle for transfer of a load to or from the vehicle.

3. A loader as in claim 1, said turntable having a front face and ends, the front face being peaked out from substantially the midpoint of said face to the ends to guide the loader to engage or disengage for coupling the ends into a transverse opening according to which side of center said face is hit on the vehicle during an attempt at coupling therewith to couple or deflect the loader away according to the angular position of rotation of the loader when engaged with the vehicle.

4. A loader as in claim 1, said vehicle being a railway car for at least one semitrailer, said turntable being longer than wide and having a lengthwise short or narrow outer or front pedestal means on top for extending along a portion of the length of a semitrailer and for extending under from either side to the opposite side of the semitrailer between supports of the semitrailer, and inner or rear pedestal means along parallel the semitrailer for supporting the side of the semitrailer facing the loader to provide a stable support for the semitrailer during transfer on the loader.

5. A loader as in claim 4, said pedestals being of a height and spaced to engage opposite side edges along the bottom of the semitrailer, so said loader can reach under the semitrailer to align the pedestals and lift the trailer from below.

6. A loader as in claim 1, said turntable having a front bumper peaked out at its middle and sloped back therefrom forming an inside angle of about 140 degrees or less between the slopes.

7. A loader as in claim 6 and a substantially horizontal disc wheel mounted to extend out slightly from the bumper at the peak to shift the loader if the wheel is engaged.

8. A loader as in claim 1, said arm being cushioned to extend in on itself when said turntable is engaged for transfer to align across a chord of the transfer are.

9. A loader as in claim 1, said loader having a coupling arm under said load arm, said means for engaging being a coupling disc supported by said coupling arm under said turntable to roll into a close fitting opening in the vehicle to couple it to rotate to align and transfer a load with relative tangential movement between the loader and said vehicle.

10. A loader as in claim 9, a coupling support track concentric about said pivot, and wheel means supporting said coupling arm to run on said coupling track at a height for coupling.

11. A loader as in claim 9 and a vehicle having low sides for said coupling disc to roll against and an opening for said coupling disc to key into to couple the loader to the vehicle for moving transfer therewith.

12. A loader as in claim 1, said arm being a frame having two members extending substantially radially out from said pivot with a circular said turntable on the outer end of each, each said turntable being for supporting an end of a load for transfer.

13. A loader as in claim 12, said members having outer ends parallel a line bisecting the angle between the pivot and the turntable pivot axii, said turntables being mounted to telescope in on said arms, means resiliently extending said turntables out on said arms, and alignment means on each said turntable to telescope the turntable to follow a chord through the transfer arc.

14. A loader as in claim 1 and a vehicle which has a chassis and a demountable body and at least one opening having vertical sides transverse through the body and chassis for said loader to engage in to register, couple, and lift the body from the chassis.

15. A rotary loader having an out-reaching arm and a load turntable on the outer end of said arm with horizontally short under-reaching and long diametrically opposite pedestal means thereon, said short pedestal means being positioned and sized for underreaching a semitrailer or vehicle having a far side and a near side with respect to the loader to lift it along a short length of the far side and said long pedestal means being positioned to engage between points along much of the near side of the vehicle to provide a stable suspension for lifting the trailer or vehicle.

16. A loader having an out-reaching arm for supporting a load for transfer purposes, an alignment turntable mounted to turn on a vertical axis on the outer end of said arm for supporting the load, alignment means limiting the arc of turning of said turntable on the axis and having depending alignment fingers spaced apart to engage and align with a vehicle or member along a support for the load to turn said turntable into alignment for transfer, and means for supporting and moving said arm to reach under a load from side to side between supports thereof whereby the turntable is turned into alignment for transfer by the engagement of said fingers.

* * * * *